United States Patent [19]

Babel et al.

[11] 4,356,620
[45] Nov. 2, 1982

[54] DISK MAGAZINE TOOL HOLDER

[75] Inventors: Werner Babel, Pfronten-Meilingen; Willi Krug, Gudensberg, both of Fed. Rep. of Germany

[73] Assignee: Maho Werkzeugmaschinenbau Babel & Co., Pfronten/Allgau, Fed. Rep. of Germany

[21] Appl. No.: 166,169

[22] Filed: Jul. 7, 1980

[30] Foreign Application Priority Data

Jul. 10, 1979 [DE] Fed. Rep. of Germany ....... 2927823

[51] Int. Cl.³ .............................................. B23Q 3/157
[52] U.S. Cl. ....................................... 29/568; 241/1.5
[58] Field of Search ............... 82/36 R, 36 A; 29/568; 74/820; 408/35; 211/1.5

[56] References Cited

U.S. PATENT DOCUMENTS

| | | | |
|---|---|---|---|
| 632,906 | 9/1899 | Swasey | 74/820 |
| 3,186,266 | 6/1965 | Coate | 29/568 |
| 3,191,294 | 6/1965 | Daugherty | 29/568 |
| 3,277,568 | 10/1966 | Wetzel | 29/568 |
| 3,277,569 | 10/1966 | Verhoeven | 29/568 |
| 4,053,968 | 10/1977 | Johnson et al. | 211/1.5 |

*Primary Examiner*—Leonidas Vlachos
*Attorney, Agent, or Firm*—Brown & Martin

[57] ABSTRACT

A disk magazine particularly useful as a tool holder for a universal drilling and milling machine comprises a disk having a plurality of tool holders disposed at fixed intervals on the outer perimeter and a drive means for rotating the disk in steps corresponding to the spacing between the tool holders. The disk comprises a connected pair of spaced apart flat plates. In a preferred embodiment, at least one of the plates is an annular plate having recessed regions on its inner periphery and the drive means comprises a Geneva drive mechanism for engaging the recessed regions. This disk magazine can be conveniently mounted on a universal drilling and milling machine with the disk horizontal above the headstock.

16 Claims, 4 Drawing Figures

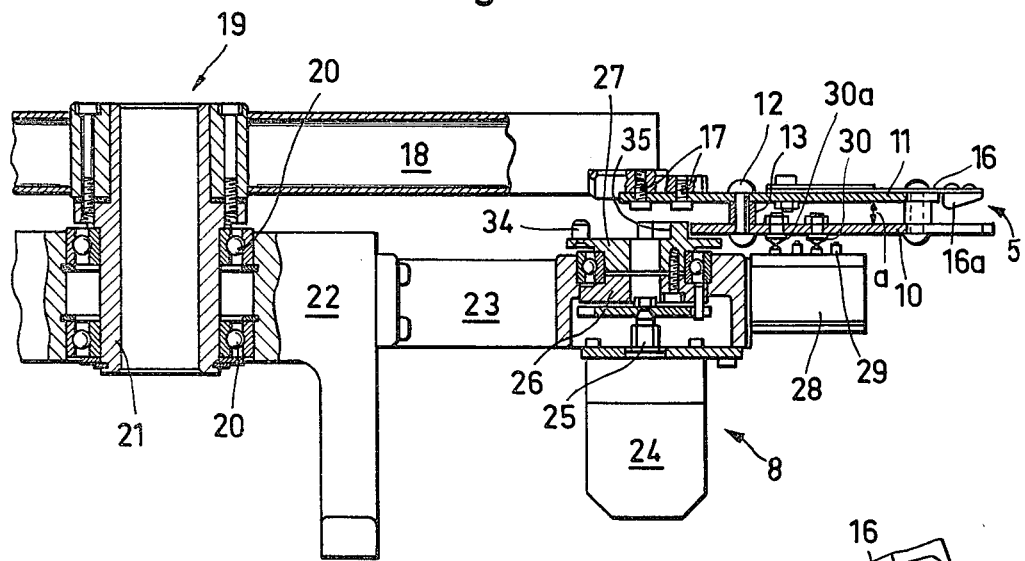
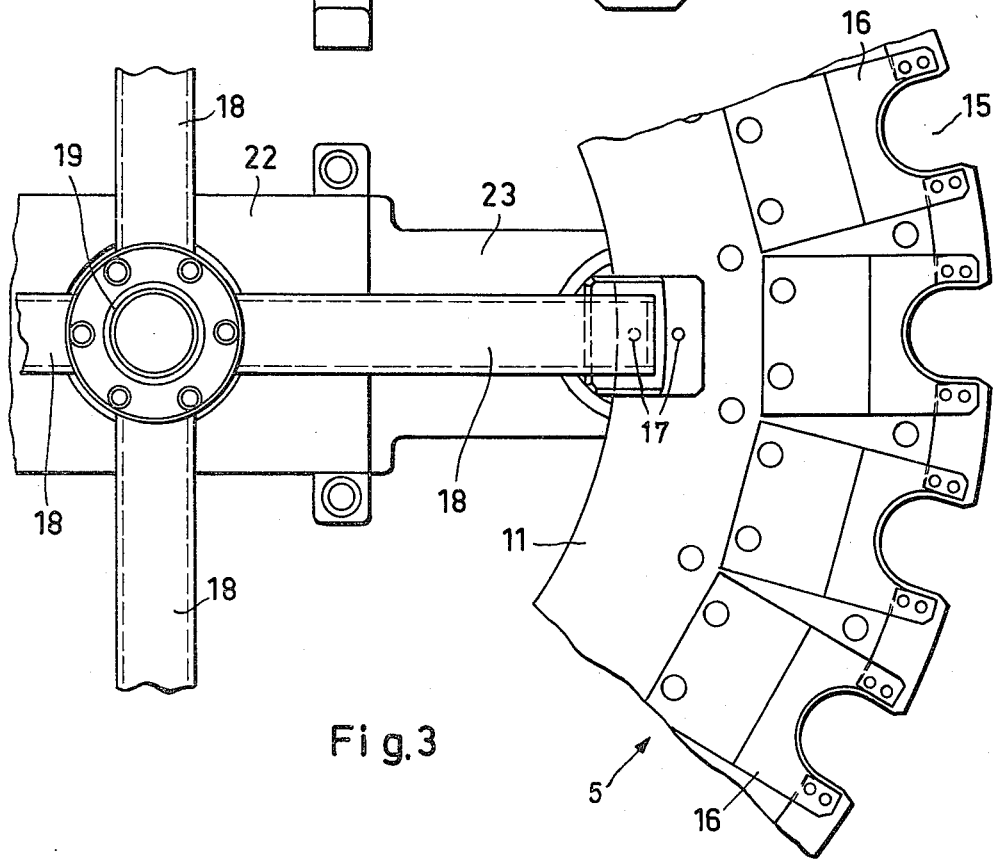

DISK MAGAZINE TOOL HOLDER

FIELD OF THE INVENTION

This invention relates to a disk magazine tool holder particularly useful as a tool holder for a universal drilling and milling machine.

BACKGROUND OF THE INVENTION

Disk magazines are particularly useful as tool holders for automatic machine tools. A plurality of tools can be placed in a plurality of tool holders at fixed intervals around the perimeter of a rotatably mounted disk. Selected tools can then be placed in position for feeding into the automatic machine by rotating the disk through an angle determined, for example, by a machine program. Typical disk magazine tool holders are shown in German Pat. No. 1,477,492 and European Patent Disclosure Document No. 000 1 218.

These disk magazine tool holders, however, possess a number of disadvantages. The disk magazines are typically quite heavy, and complex, powerful and costly drives are required to effectuate their movement.

Accordingly there exists a need for a relatively lightweight disk magazine tool holder which can be easily mounted, driven and controlled.

SUMMARY OF THE INVENTION

In accordance with the invention, a disk magazine particularly useful as a tool holder for a universal drilling and milling machine comprises a disk having a plurality of tool holders disposed at fixed intervals on the outer perimeter and a drive means for rotating the disk in steps corresponding to the spacing between the tool holders. The disk comprises a connected pair of spaced apart flat plates. In a preferred embodiment, at least one of the plates is an annular disk having recessed regions on its inner periphery and the drive means comprises a Geneva drive mechanism for engaging the recessed regions. This disk magazine can be conveniently mounted on a universal drilling and milling machine with the disk horizontal above the headstock.

BRIEF DESCRIPTION OF THE DRAWING

The nature, advantages and various features of the invention will appear more fully upon consideration of the illustrative embodiments now to be described in detail in connection with the accompanying drawing.

In the Drawing

FIG. 3 is a top view of a partially cut-away section of the disk magazine;

FIG. 4 is a partially cut-away side elevation of the disk magazine and the actuating drive.

For convenience of reference the same structural elements are designated by the same reference numerals throughout the drawing.

DETAILED DESCRIPTION OF THE PREFERRED EMBODIMENT

Figure 1:
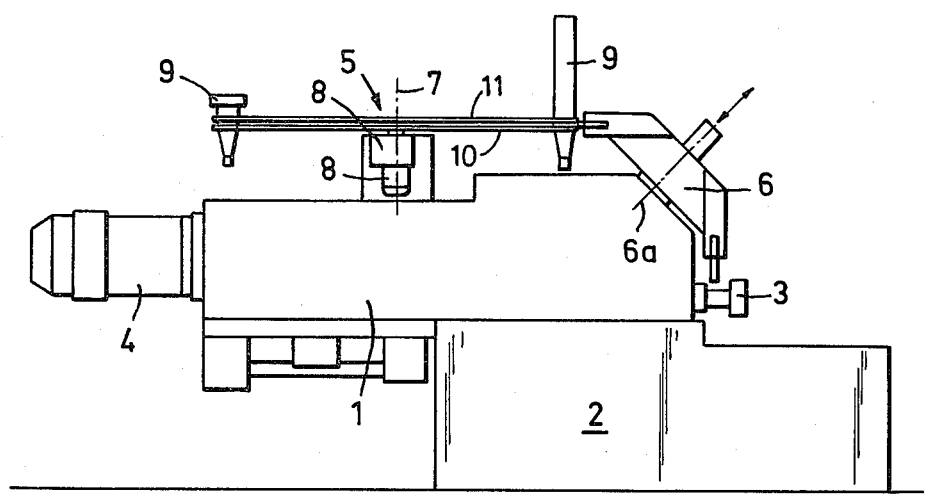
FIG. 1 is a side elevation showing, mounted on the headstock of a universal drilling and milling machine, a disk magazine tool holder in accordance with the invention.

Referring to the drawing, FIG. 1 shows a disk magazine tool holder 5 and a tool changer 6 mounted on the horizontal headstock 1 of a universal milling and drilling machine. In this embodiment, tool changer 6 extends in the direction of a 45 degree axis 6a and is rotatable through at least 180 degrees about this axis 6a. The headstock 1 is horizontally displaceable on a column 2. A horizontal spindle 3 is disposed at one end of headstock 1, and a drive motor 4 is at the other end.

Disk magazine 5 is mounted horizontally for rotation about a vertical central axis 7, which is perpendicular to the horizontal axis of spindle 3. The magazine carries a plurality of tools 9 on its outer periphery and is moved in stepwise rotation by an actuating drive 8.

Figure 2:
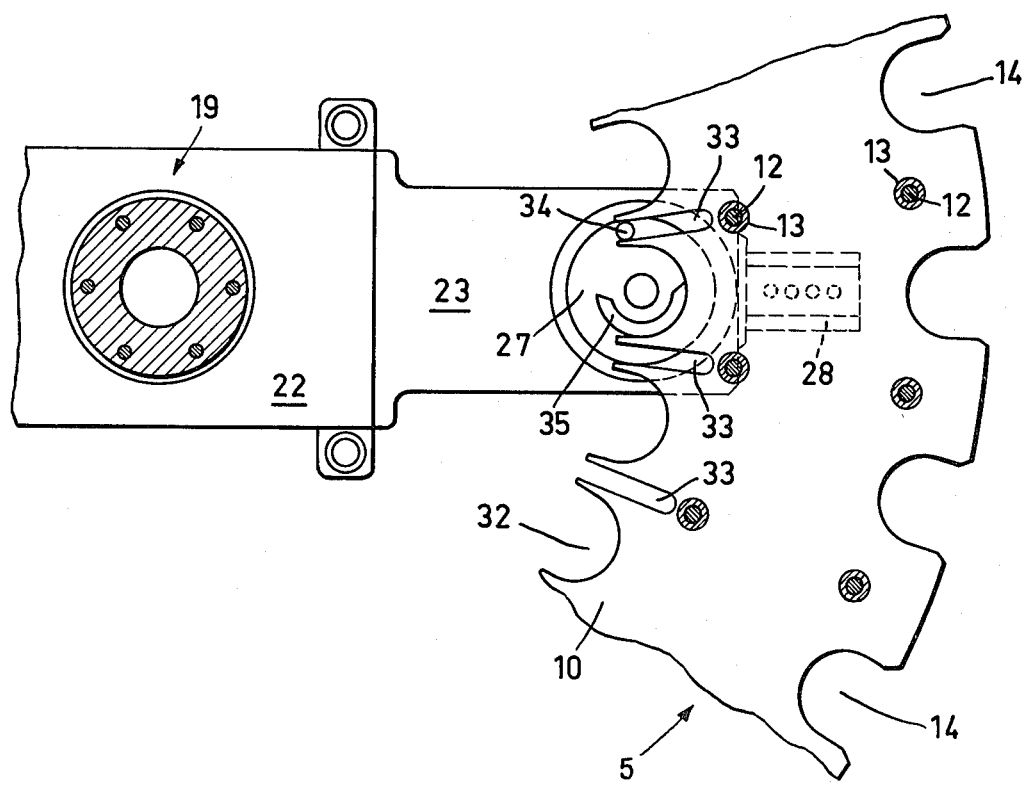
FIG. 2 is a top view of the lower disk plate and the Geneva drive.

A preferred disk magazine 5, as shown in FIGS. 2-4, comprises two separate plates such as rings 10 and 11. These rings can advantageously be punched from sheet steel two to ten millimeters thick. The rings are permanently connected together by rivets 12 and spacers 13, with a fixed spacing a between them. Both sheet-metal rings 10 and 11 have a plurality of tool holders distributed about their circumferences at fixed intervals. These tool holders comprise semicircular recesses 14 and 15 together with the spring shackles 16 on the upper sheet-metal ring 11. The spring shackles 16, pivotable upward, likewise have semicircular recesses and are provided with downwardly-pointing pawls or claws 16a at their radial end areas. The lower surfaces of the pawls or claws are beveled in different directions for engaging the radial notches or grooves in the collar of a tool shaft (not shown) and thus locating the tool 9 in magazine disk 5. A radial internal bevel on the pawls 16a draws the tool shaft into recesses 14 and 15.

The assembly composed of the two sheet-metal rings 10 and 11 is rigidly connected by studs 17 through the inner edge of the upper sheet-metal ring 11 to the ends of arms 18 of a support cross 19. This support cross 19 is mounted rotatably on a bridge 22 which, in turn, is permanently mounted on horizontal headstock 2. The support cross mounting is effectuated by a central bearing, composed of ball bearings 20 and a bushing 21. A radial support arm 23, for supporting actuating drive 8 and an indexing device 28, is bolted laterally to bridge 22.

The actuating drive 8 preferably comprises an electric motor such as a commercial automobile windshield wiper motor 24, with a vertical drive shaft 25, an intermediate gear 26, and a drive gear 27 of an associated Geneva drive, non-rotatably connected directly with intermediate gear 26. Alternatively, the drive shaft of the motor can be elastically coupled to the drive gear 27.

The indexing device 28, bolted to the support arm 23, preferably comprises actuating pins 29 for cooperating with nipples 30 projecting from the underside of the lower sheet-metal ring 10. This indexing device serves to control the positioning of the disk magazine, whereby a counter (not shown) determines the position of the disk magazine at any point in time by simply counting the nipples 30 which are arranged in circles. Nipples 30a, located on additional circles at larger angular spacings, of example 90°, can serve to monitor positioning and counting.

FIG. 2 illustrates the Geneva drive mechanism and its interaction with the lower plate of the disk. In substance, the Geneva drive comprises a rotatable drive gear or disk 27 including thereon an accentrically mounted drive pin 34 and a concentric annular guiding and locking segment 35.

As shown in FIG. 2, the inner edge of the lower sheet metal ring 10 is adapted for engaging this drive mechanism. Specifically, semicircular recesses 32 and radial blind slots 33, staggered at fixed angular intervals, are machined into the inner edge of the lower sheet-metal ring 10, in proportion with the spacing of the tool holders 14. Advantageously the radial slots are staggered at half the angular division between the tool holders. Pin 34 engages one of radial slots 33 during one complete revolution of drive gear 27 and thereby turns lower sheet-metal ring 10 of disk magazine 5 one step forward.

Annular segment 35 serves as a locking element to prevent undesirable rotation of the disk magazine. This annular segment 35 remains in a resting or sliding contact with the inner edge of semicircular recess 32 until drive pin 34 enters one of the radial blind slots 33 as drive disk 27 executes a rotary movement, and turns sheet-metal ring 10, i.e., disk magazine 5, around the rotational axis at the central bearing. The arrangement and shape of annular segment 35 and drive pin 34 are matched so that the relative position between drive gear 27 and sheet-metal ring 10 is determined b annular segment 35 in all positions in which drive pin 34 engages none of the radial slots 33. Hence, no special locking means such as socket pins or the like is required.

The invention is not limited to the embodiments shown. Thus, for example, in order to improve the rigidity of the complete disk, radial or circumferential stiffening ribs can be provided between the two sheet-metal rings 10 and 11. Furthermore, the upper sheet-metal ring can be made in the form of a solid circular disk, bolted directly to the central bearing. This eliminates the supporting cross. Honeycomb-shaped or corrugated stiffening elements can be located between the solid disk or the upper sheet-metal ring 11 shown and the lower sheet-metal ring 10. Such stiffening elements lead a high degree of structural rigidity to magazine disk 5 at the price of only a slight weight gain.

The advantage of the invention is to improve a disk magazine as a tool holder for universal drilling and milling machines in such manner that its manufacture is simplified, its weight is reduced, and the associated drives are reduced in size, without, however, having a disadvantageous effect upon the positioning accuracy.

The division of the disk into two separate sheet-metal plates, which can be made, for example in the form of simple punched or nibbled blanks of white metal, in addition to a substantial reduction in weight, offers the advantage of a considerable saving of material over conventional magazine disks, which are made as one-piece castings. Since each sheet-metal plate is provided at its periphery with a separate tong-shaped recess for each tool, and the two sheet-metal plates are permanently connected together with a space between them, the result is a high degree of rigidity of the disk and a sufficient axial length for reliable retention of each tool. The considerably reduced weight of the magazine disk means that a relatively small electric motor can be used as the drive assembly (a windshield wiper motor for example), whose drive shaft can be coupled directly to the drive gear of the Geneva drive without a reducing gear. The absence of a reducing gear results in further space savings.

Further weight savings are achieved by making the disks in the form of separate sheet-metal rings, one of which is rigidly connected to the central bearing by a support cross.

The use of a Geneva drive located on the inner edge of the sheet-metal ring 10 at a relatively large radial distance from the central axis permits yet a further reduction of the required torque.

In addition, the low weight of the magazine and the use of a bridge permit the magazine to be mounted on the headstock so that the magazine travels with it.

While the invention has been described in connection with a small number of specific embodiments, it is to be understood that these are merely illustrative of many other specific embodiments which can also utilize the principles of the invention. Thus, numerous and varied devices can be made by those skilled in the art without departing from the spirit and scope of the present invention.

What is claimed is:

1. A magazine tool holder for machine tools of the milling and drilling type, said machine tool having a headstock, the tools used by said machine tool being formed with a peripheral collar, said tool holder comprising:

a low-mass disk mounted horizontally above the headstock and comprising:
a first thin flat plate formed with a plurality of angularly spaced radial tool receiving recesses in the periphery thereof;
a second thin flat plate formed with a like plurality of angularly spaced radial tool receiving recesses in the periphery thereof;
means for securing said first and second plates together in spaced confronting relationship with said respective tool receiving recesses in registration, the space between said plates being adapted to radially receive the collar of the tools which said tool holder is adapted to engage;
said second plate being annular in shape and being formed with Geneva drive means as one portion of a Geneva drive mechanism;
means mounted to one of said plates adapted to engage and radially releasably retain a tool in each of said tool receiving recesses, the tool receiving recesses of each said plate being adapted to provide a bearing surface for the shaft of the tool adjacent the collar for stability of the tool in said magazine tool holder, said bearing surfaces having substantially equal stabilizing effect upon the tool;
a central bearing rotatably mounted to said machine tool;
means for mounting said disk to said central bearing for rotation therewith;
a Geneva drive gear engaging said Geneva drive means on said second plate; and
a motor coupled to said Geneva drive gear for selective rotation thereof and step rotation of said disk, said Geneva drive mechanism being radially spaced from the axis of said central bearing and adjacent to the periphery of said disk.

2. The tool holder according to claim 1 wherein said Geneva drive gear is formed with an eccentrically located drive pin and said inner periphery of said second plate is formed with a plurality of radial slots, said drive pin intermittently engaging one of said slots in turn to rotate said disk in step fashion.

3. The tool holder according to claim 2 wherein said radial slots are spaced around the inner periphery of said second annular plate at intervals corresponding to one half the intervals as between said tool receiving recesses.

4. The tool holder according to claim 1 wherein said first and second plates are made by stamping from sheet metal.

5. The tool holder according to claim 1 or 2 wherein said Geneva drive gear comprises an annular segment for locking and guiding said disk, and the inner periphery of said first annular plate comprises a plurality of semicircular recessed regions dimensioned for engaging said annular segment in a locking and guiding relationship.

6. The tool holder according to claim 1 wherein both said plates are annular and said disk is rigidly connected with said central bearing by said mounting means.

7. The tool holder according to claim 1 wherein said tool retaining means include spring shackles having respective semicircular recesses for partially fitting around the tool shafts, and pawl means for engaging the collars of such tools.

8. The tool holder according to claim 1, 2, 6 or 7 wherein both said plates are made of sheet steel between 2 and 10 mm thick.

9. The tool holder according to claim 8 wherein said first and second plates are made by stamping from sheet metal.

10. The tool holder according to claim 1, 2, 6 or 7 and further comprising:
nipple means projecting from said disk;
an indexing device mounted to said machine tool comprising control pins actuable by said nipple means; and
radial support means extending parallel to said disk for supporting said motor and said indexing device.

11. The tool holder according to claim 1, 2, 6 or 7 wherein said motor comprises a vertically aligned motor shaft elastically coupled to said Geneva drive gear.

12. The tool holder according to claim 1, 2, 6 or 7 wherein said motor is a low torque electric motor.

13. The tool holder according to claim 1 and further comprising stiffening rib means disposed between said plates.

14. The tool holder according to claim 1 wherein said second plate is a solid disk and the two plates are fastened together by honeycomb-shaped stiffening means.

15. The tool holder according to claim 1, 6 or 7 wherein said central bearing is rotatably connected to the headstock of the machine tool by bridge means.

16. The toll holder according to claim 1 wherein said Geneva drive mechanism is located at a position away from the central axis of said disk in order to reduce the required drive torque.

* * * * *